Nov. 17, 1953   F. H. MAGNUS ET AL   2,659,261
PORTABLE MUSICAL INSTRUMENT
Filed Aug. 8, 1950   2 Sheets-Sheet 1
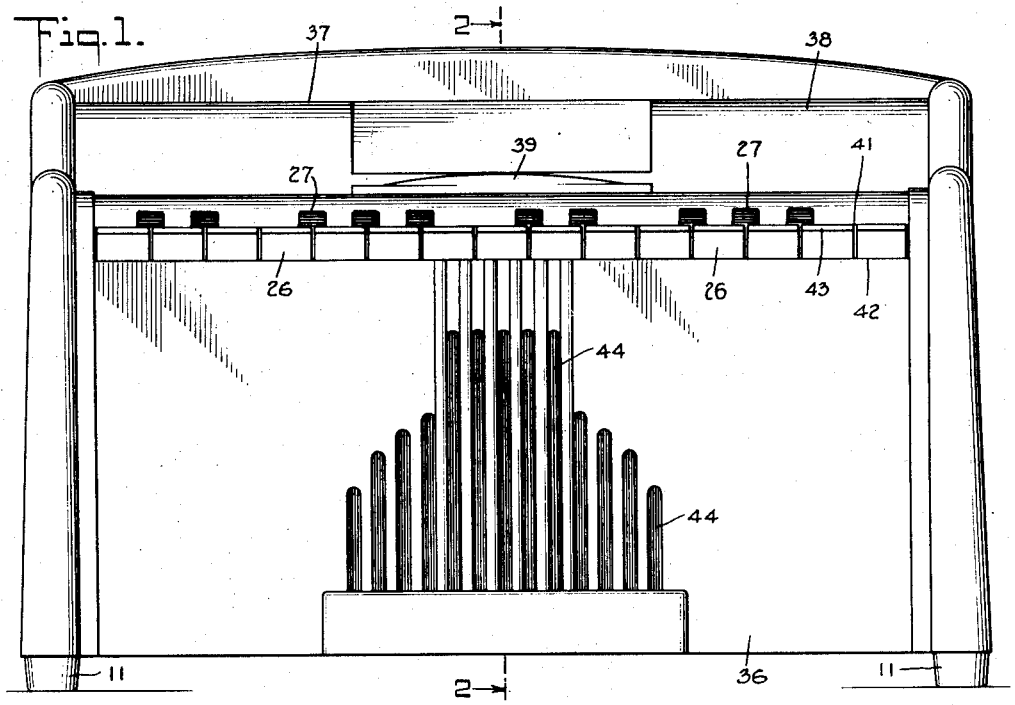
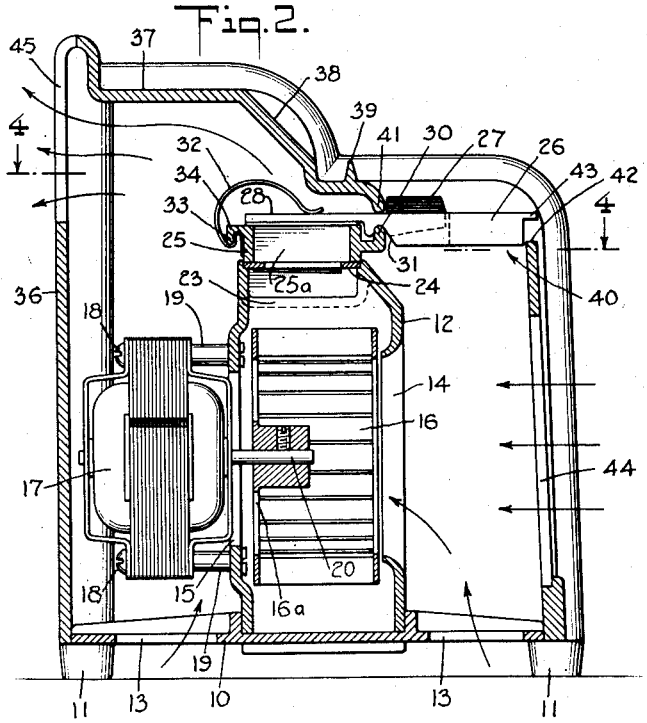
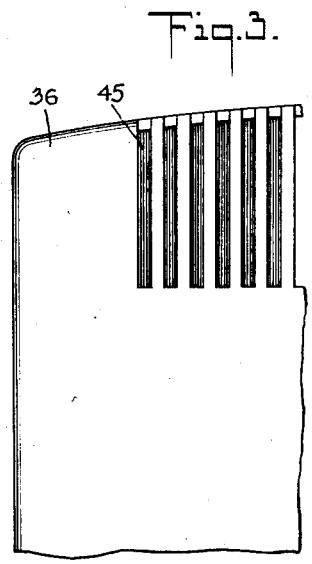
INVENTORS
FINN H. MAGNUS AND
EMIL J. ENS
BY
ATTORNEYS

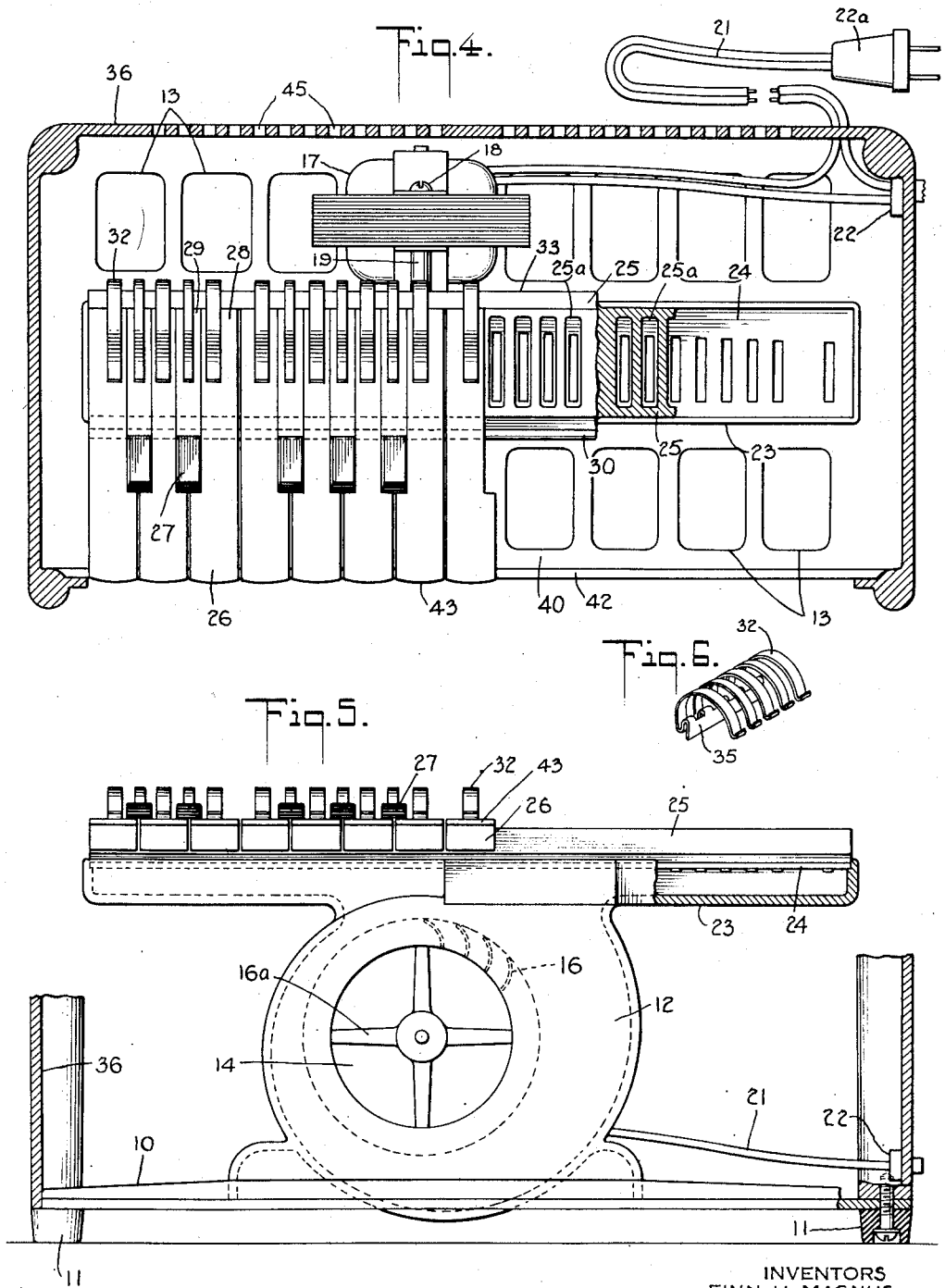

Patented Nov. 17, 1953

2,659,261

UNITED STATES PATENT OFFICE 2,659,261

PORTABLE MUSICAL INSTRUMENT

Finn H. Magnus, Essex Fells, and Emil J. Ens, Newark, N. J., assignors to Magnus Harmonica Corporation, Newark, N. J., a corporation of New Jersey Application August 8, 1950, Serial No. 178,202

6 Claims. (Cl. 84—351)

The present invention relates to new and useful improvements in musical instruments and relates more particularly to a portable, wind-operated musical instrument such as a toy electric organ or harmonium.

The various objects and advantages of the invention will be best understood from the following description and the accompanying drawings in which:

Fig. 1 is a front elevation view of a musical instrument embodying the invention;

Fig. 2 is a vertical section taken along the line 2—2 of Fig. 1;

Fig. 3 is a fragmentary view taken from the rear of the instrument illustrated in Fig. 1;

Fig. 4 is a section view generally along the line 4—4 of Fig. 2;

Fig. 5 is a front view in partial section of the instrument illustrated in Fig. 1 with certain parts being omitted for clarity; and Fig. 6 is a perspective view of a group of key springs as used in the instrument illustrated in Fig. 1.

Referring to the drawings in detail, there is a base 10 which may be made of plastic or other suitable material. The base 10 is supported in spaced relation to the surface on which the instrument rests by legs 11 of rubber or other suitable material located at its corners. A blower housing and scroll 12 is supported on top of the base 10 and is located approximately at the center of the base. The blower housing and scroll may also be molded from plastic material and may be made in two halves that are joined together.

The base 10 has a series of openings or air inlet ports 13 surrounding the fan scroll and housing 12 and through which air can pass from beneath the base to the blower scroll and housing 12. The blower housing and scroll 12 has air inlets 14 and 15 on its front and rear faces, respectively, through which air is drawn into the housing by the rotation of a double inlet, drum or barrel type rotor 16. The rotor 16 is located within the housing 12 and is driven by an electric motor 17 that is supported on the rear face of the housing 12 by studs 18. The motor 17 is spaced from the housing by spacers 19 of heat insulating material that surround the studs 18. The spacers minimize the transfer of heat from the motor to the plastic housing 12 and prevent the possibility of such heat damaging the plastic blower housing. The motor 17 is located centrally with respect to the inlet 15 in the rear face of the housing 12 and is spaced from the rear of the housing so that air can be drawn around and through the motor to the air inlet 15 when the blower is operating.

As shown best in Figs. 2 and 5, a shaft 20 of the motor 17 extends into the inlet 15 of the scroll 12 and is keyed to the hub of a spider 16a that supports the rotor 16 within the housing 12. As shown in Fig. 4, the motor 17 is connected by a conductor cord 21 through a switch 22 and an electrical connector plug 22a to a source of electrical energy. The switch 22 permits the motor and blower to be operated as desired when the plug 22a is inserted in an electrical outlet.

An air outlet is located at the top of the blower housing and scroll 12 and communicates with an elongated horizontal air chamber 23 that may be formed integrally as part of the blower housing and scroll. A reed plate 24 having a series of spaced reeds 24a or other suitable wind-operated note or sound producing members such as whistles is supported at the upper end of the air chamber 23. The reed plate 24 shown in the illustrated embodiment of the invention is a chromatic reed plate made of plastic and is of the type commonly used in harmonicas or the like. Such reed plates are well known and thus, need not be described in detail here. However, the reed plate 24 extends for the length of the air chamber and the air chamber and the reed plate may be made of a suitable length to produce the range of musical notes desired. A comb section 25 is superimposed on and supported above the reed plate 24. The comb section 25 has a series of vertical passageways 25a that extend through the comb section with each of the passageways 25a communicating with one of the individual reeds 24a of the reed plate 24. Thus, each passageway defines a tone chamber above its respective reed in which there is a confined column of air against which the reed acts when it is set into vibration by the passage of air under pressure through the reed plate from the air chamber 23.

Keys 26 and 27, for sharps and flats, respectively, molded of plastic material are pivotally mounted at the top of the comb section 25. The keys 26 and 27 have operating portions that extend forwardly of the comb section 25 and have rearwardly extending portions 28 and 29, respectively, that extend over the upper ends of the passageways 25a in the comb section 25. The rearwardly extending portions of the keys have flat surfaces on their lower sides that engage with the top of the comb section 25 and close the passageways 25a when the keys are in their normal or non-operating position. The pivotal movement of keys 26 and 27 when their forward ends are pressed down, opens the passageways 25a corresponding to the keys being operated and permits air to pass through reed plate at such passageways from the air chamber 23.

As shown best in Fig. 2, the keys 26 and 27 are pivotally mounted on a ledge 30 that is formed by an L-shaped flange extending along and projecting beyond the front edge of the comb section 25. The ledge 30 is shaped to engage with recesses 31 in the bottoms of the keys 26 and 27 intermediate the ends thereof so that the keys are pivotally supported on the flange 30 as fulcrum. The tops of the rearwardly extending portions of the keys are engaged by springs 32 which hold the rearwardly extending portions of the keys in engagement with the top of the comb section 25 so as to close the passageways 25a. The springs 32 permit the operating ends of the keys to be pressed down thus, raising the rear ends of such keys and opening the appropriate passageway in the comb section. When the keys are released, the springs return them to their closed position.

The springs 32 are curved leaf springs and one end of each of the springs is anchored in a downwardly facing groove 33 at the rear of the comb section 25. The spring anchoring groove 33 is formed by a downwardly projecting flange 34 extending along the rear edge of the comb section 25. As shown in Fig. 6, a number of the springs 32 may be stamped from a single strip of suitable sheet material and may be connected by a strip 35 at their fixed or anchored ends. This arrangement makes it more convenient to assemble the springs 32 in their proper positions on the comb section 25 to engage their respective keys and also tends to prevent the springs from moving lengthwise out of such position accidentally. As shown in Fig. 6, the springs 32 may be of different widths depending on whether they are to engage the large keys 26 or the small keys 27.

A case 36 which may also be molded from plastic materials encloses the mechanism just described and is removably secured to the base 10 in a suitable manner, as by studs extending through the legs 11 of the base. Toward the rear of the top 37 of the case 36 there is an inclined surface, as indicated at 38, at the foot of which there is a ledge 39 to support sheets of music. At the front of the top 37 of the case there is a slotted opening 40 through which the operating ends of the keys 26 and 27 extend to a playing position where they are accessible to the person playing the instrument. The slotted opening 40 in the case is defined by the front edge 41 of the top 37 and the top edge 42 of the front wall of the case which are spaced both laterally and horizontally with respect to each other. The front edge 41 of the top 37 is located above the fulcrum 30 on which the keys 26 and 27 are pivoted and prevents the keys from being lifted from the fulcrum 30. The top edge 42 of the front wall of the case extends in front of the forward ends of the keys 26 and prevents these keys from being removed from the fulcrum 30 by moving them forward. A projection 43 extends beyond the forward end of each of the keys 26 at the top thereof and engages with the top of the front wall of the case so as to form a stop that limits the downward movement of these keys.

The case 36 has air inlet openings 44 in the front wall thereof through which air can pass to the blower. The air inlet openings 44 in the case are located immediately in front of the air inlet 14 in the front of the blower housing 12 so as to provide a direct flow of air to the air inlet 14 in the front of the blower housing. The case 36 also has outlet openings 45 at the top of its rear wall through which musical notes or other sounds from the tone chambers 25a may pass to the outside of the case.

In order that there will be sufficient air available for the proper operation of the blower, the area of the inlet openings 13 in the base 10 should be approximately one-third of the total area of the base 10 and the total volume of air surrounding the blower in the case 37 should be approximately one and one-half times the area of the inlet openings 14 and 15 in the blower housing and scroll 12. In the specific embodiment of the invention illustrated, the blower has a three-inch rotor which is driven at 3200 R. P. M. and delivers the air under approximately one and one-half inches of water pressure to the air chamber 23. A blower having these operating characteristics has been found to operate satisfactorily in an instrument having the proportions illustrated and to produce notes having a satisfactory volume that may be sustained over any period desired. However, it will be understood that blowers having different operating characteristics may be used in instruments of different sizes or employing different sound producing arrangements.

As previously mentioned, the base 10, the blower scroll and housing 12, the reed plate 24, and the comb section 25 may be molded from suitable plastic materials and can be readily assembled by securing them together with suitable adhesives without the use of screws or rivets. This construction provides suitable air-tight joints between the blower housing, the reed plate and comb section so that there will be no air leakage between the blower and the passageways in the comb section. It also provides strong construction that will withstand abuse.

While the particular embodiment of the present invention is in the form of an electrically operated, toy organ which is designed to produce musical notes having an essentially true pitch, it will be appreciated that various features of the present invention may be effectively utilized in other types of wind-operated instruments which produce musical notes or other sounds. It will also be understood that various modifications and changes may be made in the specific embodiment of the invention illustrated and described herein without departing from the scope of the invention as described by the following claims.

We claim:

1. A portable musical instrument of the type employing a reed plate having a series of spaced vibratable reeds thereon, an electrically operated blower having an outlet communicating with said reeds and manually operable keys for controlling the passage of air from the blower through the respective reeds that is characterized by a housing enclosing said blower and said reed plate and reeds, said housing having openings therein for the passage of air into and out of the housing and having an elongated opening therein through which the series of manually operable keys extend, said elongated opening having laterally spaced side edges which are positioned at spaced points on opposite sides of the keys, a blower scroll supported within said housing, said blower scroll having air inlet and outlet openings therein with the reed plate being supported on the blower scroll in communication with said outlet opening and means for pivotally supporting the keys on said blower scroll with one end of each of the keys being positioned in operative relation to one of the reeds on the reed plate with the other end of the keys extending through the elongated opening in the housing.

2. A portable musical instrument as defined in claim 1 wherein the means for pivotally supporting the keys comprises a comb section having a series of spaced passageways extending therethrough, said comb section being supported on the blower scroll with the passageways therein communicating with the respective reeds on said reed plate, an upwardly projecting support extending along one side of the comb section with the keys being fulcrumed on said support at points intermediate their ends.

3. A portable musical instrument as defined in claim 1 wherein the means for pivotally supporting the keys comprises a comb section having a series of spaced passageways extending therethrough, said comb sectoin being supported on the blower scroll with the passageways therein communicating with the respective reeds on said reed plate, an upwardly projecting support extending along one side of the comb section with the keys being fulcrumed on said support at points intermediate their ends and a downwardly extending flange extending along the other side thereof and a series of spaced leaf springs, each of said springs having one end engaging with said flange and the other end thereof engaging with one of the keys.

4. A portable musical instrument as defined in claim 1 wherein the means for pivotally supporting the keys comprises a comb section having a series of spaced passageways extending therethrough, said comb section being supported on the blower scroll with the passageways therein communicating with the respective reeds on said reed plate, an upwardly projecting support extending along one side of the comb section with the keys being fulcrumed on said support at points intermediate their ends, said support for the keys being positioned in opposing relation to one of the edges of the elongated opening in the housing.

5. A portable musical instrument of the type employing a reed plate having a series of spaced vibratable reeds thereon, an electrically operated blower having an outlet communicating with said reeds and manually operable keys for controlling the passage of air from the blower through the respective reeds that is characterized by a housing enclosing said blower and said reed plate and reeds, said housing having an elongated opening therein through which the manually operable keys extend, said elongated opening having laterally spaced side edges which are positioned at spaced points on opposite sides of the keys, a blower scroll supported within said housing, said blower scroll having air inlet and outlet openings therein, an air chamber supported on and communicating with the outlet of the blower housing with the reed plate being supported on said air chamber and means carried by the reed plate for pivotally supporting the keys with one end of each of the keys being positioned in operative relation to one of the reeds on the reed plate with the other end of the keys extending through the elongated opening in the housing.

6. A portable musical instrument as defined in claim 5 wherein the means carried by the reed plate for pivotally supporting the keys comprises a comb section having a series of spaced passageways extending therethrough, said passageways communicating with the respective reeds on said reed plate, an upwardly projecting support extending along one side of the comb section with the keys being fulcrumed on said support at points intermediate their ends and springs engaging with said keys, said springs having one end fixed to the comb section and being biased to urge the keys into engagement with the comb section.

FINN H. MAGNUS.
EMIL J. ENS.

References Cited in the file of this patent

UNITED STATES PATENTS

| Number | Name | Date |
|---|---|---|
| 201,974 | Zogbaum | Apr. 2, 1878 |
| 472,032 | Clark | Apr. 5, 1892 |
| 501,803 | Muhlmann | July 18, 1893 |
| 970,144 | Virgil | Sept. 13, 1910 |
| 1,995,751 | Sampietro | Mar. 26, 1935 |
| 2,185,932 | Skinner | Jan. 2, 1940 |
| 2,279,144 | Lohr | Apr. 7, 1942 |
| 2,293,101 | Berger | Aug. 18, 1942 |
| 2,548,000 | Broughton | Apr. 10, 1951 |

FOREIGN PATENTS

| Number | Country | Date |
|---|---|---|
| 331,982 | Italy | Nov. 20, 1935 |